Figure 1:
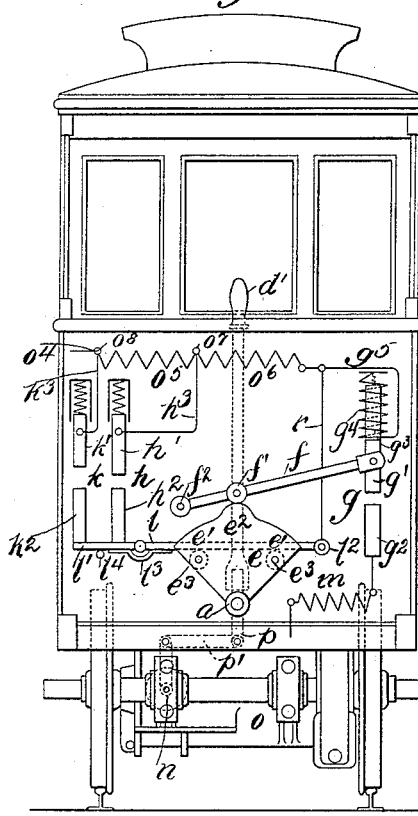

(No Model.) 2 Sheets—Sheet 1.

E. G. W. C. HOFFMANN.
MEANS FOR OPERATING ELECTRIC RAILWAY VEHICLES.

No. 552,369. Patented Dec. 31, 1895.

WITNESSES.
DeWitt C. Tanner
W. Clyde Jones

INVENTOR.
Ernst G. W. C. Hoffmann,
BY Barton & Brown
ATTORNEYS.

ANDREW B. GRAHAM. PHOTO-LITHO. WASHINGTON. D.C.

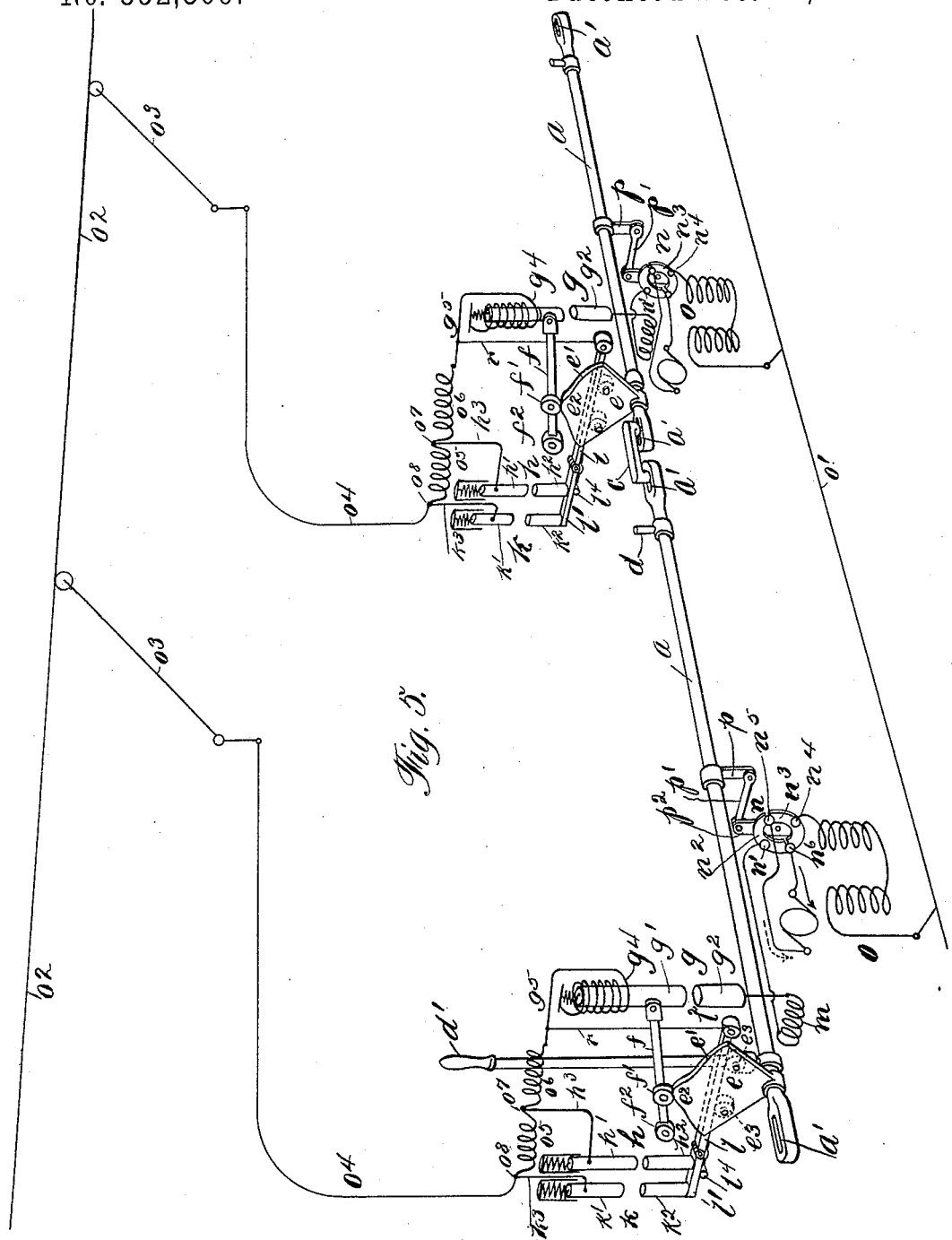

UNITED STATES PATENT OFFICE.

ERNST GUSTAV WILHELM CARL HOFFMANN, OF CHARLOTTENBURG, GERMANY, ASSIGNOR TO THE SIEMENS & HALSKE ELECTRIC COMPANY OF AMERICA, OF CHICAGO, ILLINOIS.

MEANS FOR OPERATING ELECTRIC RAILWAY-VEHICLES.

SPECIFICATION forming part of Letters Patent No. 552,369, dated December 31, 1895.

Application filed September 3, 1895. Serial No. 561,222. (No model.) Patented in Italy April 8, 1895, No. 38,405; in England May 5, 1895, No. 6,007, and in France June 20, 1895, No. 245,761.

*To all whom it may concern:*

Be it known that I, ERNST GUSTAV WILHELM CARL HOFFMANN, a subject of the Emperor of Germany, residing at Charlottenburg, near Berlin, Germany, have invented new and useful Improvements in Means for Operating Electric-Railway Vehicles, (Case No. 617,) of which the following is a specification, and for which Letters Patent have been granted in Italy, No. 38,405, dated April 8, 1895; in England, No. 6,007, dated May 5, 1895, and in France, No. 245,761, dated June 20, 1895.

This invention relates to means for operating electric-railway cars or vehicles, and has for its object to facilitate the most efficient and convenient operation of electric railways by providing for switching into or out of circuit the electric motor or motors of a car and to cause the car to travel in either direction, or forward or backward, while using but one set of switch devices, or without requiring duplication of switch devices at both ends of the car or vehicle.

A further object of the invention is to provide for switching into or out of circuit the electric motors, and also for actuating the motor-current-reversing devices, of an entire train of cars from either end of any one car in the train.

The invention involves the use of means such, for instance, as a longitudinal bar or connection extending along each car and adapted for operating at either end of the car by a lever or device under control of the motorman; and also of switch devices and motor-current-reversing devices also actuated, preferably, by or through the agency of the motorman's lever; and also of couplings between the longitudinal bars or connections of the several cars of a train, whereby the main-line current may be sent through the car motor or motors in either direction for moving one car or an entire train of cars either forward or backward at the pleasure of the motorman.

The invention includes various details of construction which contribute to the efficiency of the entire system or method of operation.

The invention will first be described and then will be defined in claims hereinafter set forth.

Reference is to be had to the accompanying drawings, forming part of this specification, and in which similar letters indicate corresponding parts in the several views.

Figure 2:
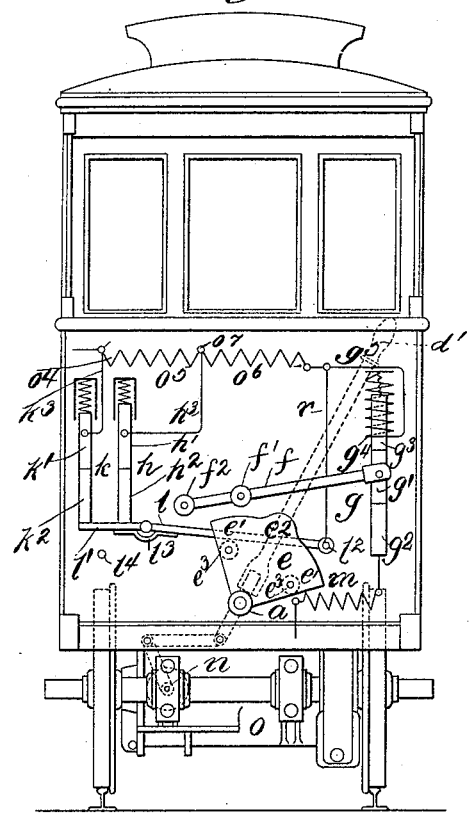
Figure 3:
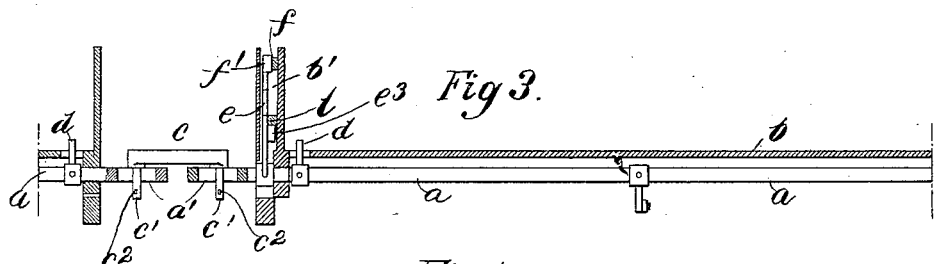
Figure 4:
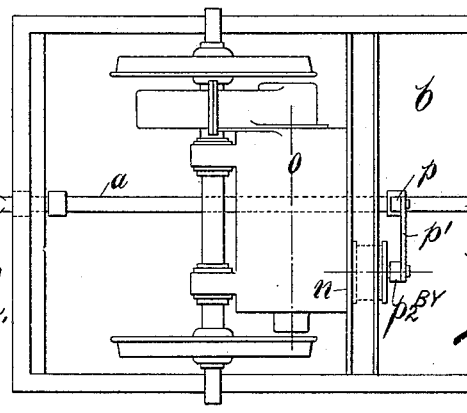

Figure 1 is an end elevation of a railway-car fitted with switch devices in accordance with this invention, the parts being adjusted to cut current out of the motor for stopping the car. Fig. 2 is an end view of the car with the switch devices adjusted for assuring normal maximum speed of travel of the car. Fig. 3 is a detail longitudinal sectional elevation of the coupled longitudinal switch-bars of two cars in train. Fig. 4 is a bottom plan view of one end portion of a car, showing the switch-bar, the current-reverser, and the electric motor; and Fig. 5 is a diagrammatic perspective view illustrating the switch devices of two coupled cars and their connections with the supply and return conductors.

In carrying out this invention each car is provided with a longitudinal connection reaching from one end of the car to the other and preferably adapted for coupling to a like connection of another car. This longitudinal connection is adapted for operation by lever or equivalent device from or at each end of the car. At one end the car has electric switches and switch-operating devices actuated from the longitudinal connection which also operates the current-reverser through which current passes to the electric motor on the car. Any suitable trolley device takes working current from a supply-conductor, in this instance an overhead wire, and the return to the generator is through the rails on which the car travels.

The above-named longitudinal connection is preferably a metal bar $a$, which is journaled for partial rotation at and along the center of the car and below its floor $b$, and projects beyond the end platforms of the car where it has longitudinal slots $a'$ adapting it for coupling to a like longitudinal bar $a$ of the next car in front or behind. The coupling of two cars is effected by placing the pendent end studs $c'$ $c'$ of the coupling device $c$ into the slots $a'$ of the bars $a$ $a$ of two cars and then inserting keys or retaining-pins $c^2$ in the studs $c'$ below the bars, as shown in Figs. 3 and 5 of the drawings. The keys $c^2$ allow vertical play or adjustment of the coupled bars while the studs $c'$ have play along the slots $a'$. Hence this coupling of the switch-bars $a$ $a$ of two cars makes every necessary provision for varying distances between the bodies of two cars, for uneven heights of the cars, and for free lateral play of the cars while rounding curves of the track, during which time the studs $c'$ turn freely in the slots $a'$ of the laterally-immovable ends of the bars. The coupling also provides for turning the bar $a$ of one car by or from the coupled bar $a$ of the next car.

But one set of switch devices is used on each car and these devices are preferably arranged and protected within a casing $b'$ formed at or next the dashboard at one end of the car. A radial stud or arm $d$ fixed to the bar $a$ projects upward through a slot in the car-platform and is adapted to fit the socketed end of a lever $d'$, which may be fitted over the stud and then may be moved at its handle end to one side or the other to rock the bar $a$ correspondingly. A stud $d$ is also fixed to the bar $a$ at the other end of the car, thus allowing the bar to be rocked by the lever applied to either stud at either end of the car and causing the bars $a$ of two or more coupled cars of a train to be turned or rocked simultaneously by means of the couplings $c$ and by one lever $d'$ operated at either end platform of any one car of a train. To the bar $a$ is fixed a cam-plate $e$, whose outer convexed edge $e'$ has a central projection or prominence $e^2$. These cam-surfaces $e'$ $e^2$ are adapted to act on an antifriction-roller $f'$, journaled to a lever $f$, which is fulcrumed at $f^2$ to the wall of the dashboard-casing $b'$, and at its outer free end carries the movable carbon $g'$, which, with an opposing carbon $g^2$, constitutes a carbon-switch $g$ held within the casing $b'$. The carbon $g'$ is connected to an iron core $g^3$, around which is a wire coil $g^4$, thus forming a solenoid magnet. In the casing $b'$ are also placed two other carbon-switch devices $h$ $k$. The upper carbons $h'$ $k'$ of these two switches are preferably arranged with superposed springs and to yield upward when their opposing carbons $h^2$ $k^2$ are brought to them to assure square end contact. Said carbons $h^2$ $k^2$ are held to the outer free and preferably hinged end $l'$ of a lever $l$, which is fulcrumed at $l^2$, and may be raised to close the switches $h$ $k$ successively by either one of two studs or rollers $e^3$ $e^3$, mounted upon the cam-plate $e$. The hinged end $l'$ of the lever $l$ is normally held in line with the main part of the lever by a spring $l^3$ which crosses the hinge-joint. This joint provides for square end contact of the opposing carbons of both switches $h$ $k$ as the lever is lifted, and when the switches are open the dropped lever rests on a stop $l^4$.

A constantly-interposed resistance $m$ is connected with the carbon $g^2$ of the switch $g$ and also to a contact $n'$ in constant connection with a contact-plate $n^2$ of a current-reverser $n$ on the car. The opposite separated contact-plate $n^3$ of the reverser is in constant connection with a contact $n^4$ in circuit with the field-magnet wire of the car-motor $o$ connected with the return-conductor $o'$, which here is the track-rails on which the car runs. Two contacts $n^5$ $n^6$ connected to opposite brushes of the motor-armature are also adapted to connect with the plates $n^2$ $n^3$ of the current-reverser $n$. A reversal of current through the motor is effected from the longitudinal connection or bar $a$ by means of a rigid arm $p$ on said bar coupled by a link $p'$ to a plate $p^2$, to which the reverser contact-plates $n^2$ $n^3$ are fixed. As the bar $a$ is rocked in opposite directions, the plates $n^2$ $n^3$ will be turned to reverse the current and the direction of rotation of the motor-armature to cause the car to run forward or backward at the will of the motorman handling the lever $d'$, and simultaneously operating the switches $g$ $h$ $k$, as hereinafter more fully explained.

The supply-conductor $o^2$, in this case an overhead wire, is connected by a suitable trolley device $o^3$ and a wire $o^4$ on the car with two starting-resistances $o^5$ $o^6$, the latter being in circuit by a wire $g^5$ with the wire $g^4$ of the carbon-switch $g$. Another contact or binding post $o^7$ interposed between the two resistances $o^5$ $o^6$ is in circuit by a wire $h^3$ with the carbon-switch $h$, and a wire $k^3$ connects the switch $k$ with a binding-post $o^8$, to which the wire $o^4$ and resistance $o^5$ are attached. A wire $r$ connects the fulcrum $l^2$ of lever $l$ with the wire $g^5$. All the carbon-switches and the resistances and their wire connections are protected within a casing $b'$ on the car-platform dashboard.

The operation is as follows: When the motorman's lever $d'$ is adjusted to the vertical, central or neutral position, (shown in Figs. 1, 3, and 5 of the drawings,) the projection $e^2$ of cam $e$ holds the lever $f$ up and thereby separates the carbons $g'$ $g^2$ of switch $g$, and the lever $l$ is in lowermost postion and holds the carbons of the switches $h$ $k$ separated, all three switches now being open, thus cutting out the motor to stop the car. If now the lever $d'$ be thrown over to one side in the direction shown in Fig. 2 of the drawings, the first effects will be to swing the cam $e$ to carry its central projection $e^2$ from under the roller $f'$ of lever $f'$, thus allowing the carbons of switch $g$ to come together, and also to simultaneously adjust the contacts $n^2$ $n^3$ of the current-reverser $n$ to allow the current now passing from the line $o^2$ through wire $o^4$ and the two resistances $o^5$ $o^6$ and wires $g^5$ $g^4$, closed switch $g$, resistance $m$, and the current-reverser to pass to the motor and start it in one direction of rotation but under full resistance. As this movement of the lever $d'$ is continued after the switch $g$ is closed, one roller or stud $e^3$ on the cam $e$ lifts the lever $l$ and first closes the switch $h$, thereby cutting out the resistance $o^6$ and causing the current to pass from wire $o^4$ through resistance $o^5$ to post $o^7$, wire $h^3$, the switch $h$, lever $l$, wires $r$ $g^5$ $g^4$, switch $g$ and resistance $m$ to the motor. A still further movement of the lever $d'$ closes the switch $k$; all three switches $g$ $h$ $k$ now being closed, as shown in Fig. 2 of the drawings. Both starting-resistances $o^6$ $o^5$ now are cut out and the full current passes from wire $o^4$ through wire $h^3$, switch $k$, lever $l$, wires $r$ $g^5$, and solenoid $g^4$, switch $g$, and resistance $m$ to the motor, and the car runs under full headway with maximum current. Should the resistance be switched out too quickly by too sudden movement of the lever $d'$, the excessive current in passing through the solenoid $g^4$ will draw the core $g^3$ upward within it and thereby separate the carbons $g'$ $g^2$ of switch $g$ more or less to temporarily break the circuit or to form an arc which will offer sufficient resistance to the current to prevent injury to the motor. To stop the car, the lever $d'$ is returned to neutral central position. During this movement the lever $l$ is allowed to fall to first open the switch $k$ and cut in the resistance $o^5$ and then open the switch $h$ to cut in the resistance $o^6$, and finally as the projection $e^2$ of cam $e$ rides under the roller $f'$ of lever $f$ the latter will open the switch $g$ and break the circuit thereat and cut out the motor.

When the car is to be backed or run in the opposite direction to that above described, the lever $d'$ will be thrown over to the other side from a central neutral position, or toward the left-hand side of Fig. 2 of the drawings. The successive closure of the carbon-switches $g$ $h$ $k$ will be effected by action of the levers $f$ $l$ in substantially the same manner as above described, but the current-reverser contact-plates $n^2$ $n^3$ will be readjusted to cause current to pass through the motor in the opposite direction thereby giving reverse direction of movement to the car.

When the car runs in the first-described direction and the lever $d'$ is adjusted as in Fig. 2 of the drawings, the contacts $n'$ $n^6$ are on the plate $n^2$ of the current-reverser, and the contacts $n^4$ $n^5$ are on the plate $n^3$ thereof. The current now flows from the resistance $m$ to contact $n'$, and plate $n^2$, contact $n^6$ to one brush and the armature in direction of the full-line arrow in Fig. 5, and thence via the opposite brush to contact $n^5$, plate $n^3$ and contact $n^4$ to the return-conductor $o'$. When the lever $d'$ is adjusted to the other side, the contacts $n'$ $n^5$ are on plate $n^2$, and the contacts $n^4$ $n^6$ are on the other plate $n^3$, and the current now flows from the resistance $m$ to contact $n'$, plate $n^2$, contact $n^5$ to one brush and the armature in the direction of the dotted arrow in Fig. 5, and thence to the opposite brush, the contact $n^6$, plate $n^3$, and contact $n^4$ to the return-conductor.

It will be seen that by movement or successive movements of the lever $d'$ by the motorman in one direction from a central neutral position the resistances are adjusted to start the car and run it at full speed in one direction, and that by a reverse movement of lever $d'$ from the neutral position toward the other side of the car the resistances will be likewise adjusted, but the current will be sent through the motor in the reverse direction to cause the car to start and run at full speed in the opposite direction. Furthermore the longitudinal connection or bar $a$ allows application of the lever $d'$ to its stud $d$ at either end platform of the car for controlling the switches and current-reverser therefrom; and as the bars $a$ of two or more cars may be coupled by the device $c'$ $c$ $c^2$, as above described, the switch and current-reverser devices of two or more cars coupled in a train may likewise be actuated to control the car-motors and the direction of travel by a lever used at either the front or rear platform of either or any car in the train.

This invention is not limited to the use of the precise means and mechanism shown and above described, as various modifications of the longitudinal connection and of the electric switch and current-reverser and motor devices and their operating means may be employed without departing from the essential principles of novelty and utility embodied in the appended claims.

Having thus described my invention, what I claim as new, and desire to secure by Letters Patent, is—

1. An electric railway vehicle having a rotative bar or shaft adapted for operating current controlling resistance devices and motor current reversing devices, one or both, and provided with a longitudinal slot, combined with a coupling device having studs adapted to the slots of the rotative bars or shafts of two vehicles.

2. An electric railway vehicle having a rotative bar or shaft adapted for operating current controlling resistance devices and motor current reversing devices, one or both, and provided with a longitudinal slot, combined with a coupling device having studs adapted to the slots of the rotative bars or shafts of two vehicles, and retainers in the studs allowing their vertical play in the slots.

3. An electrical railway vehicle having a longitudinal connection extending between both ends thereof and adapted for operation at either end, and also adapted for coupling to the longitudinal connection of another vehicle or vehicles, combined with current controlling resistance devices on the vehicle or vehicles operative by or from the longitudinal connection of one vehicle.

4. An electric railway vehicle having a longitudinal connection extending between both ends thereof and adapted for coupling to a longitudinal connection of another vehicle or vehicles, combined with a motor or motors, and motor current reversing devices on the vehicle or vehicles and adapted for operation by or from the longitudinal connection of one vehicle.

5. An electric railway vehicle having a longitudinal connection extending between both ends thereof and adapted for coupling to a longitudinal connection of another vehicle or vehicles, combined with current controlling resistance devices, a motor or motors, and motor current reversing devices on the vehicle or vehicles operative simultaneously with the resistance devices by or from the longitudinal connection of one vehicle.

6. The combination, with an electric railway vehicle, of a cam, means for actuating the cam; an electric motor, a switch adapted to be put in circuit with said motor and with supply and return conductors, and a lever connected to the switch and actuated by the cam regardless of the direction of rotation of the cam.

7. The combination, with an electric railway vehicle, of a cam, means for actuating the cam, an electric motor, a switch adapted to be put in circuit with said motor and with supply and return conductors, a motor current reverser actuated simultaneously with the cam, and a lever operated by the cam and opening or closing the switch.

8. The combination, with an electric railway vehicle, of a cam, means for actuating the cam, a starting resistance of one or more sections, and one or more divided switch devices coupled at one part to corresponding starting resistance sections and sustained at the other part by a lever actuated by the cam.

9. The combination, with an electric railway vehicle; of a cam, means for actuating the cam, an electric motor, a switch adapted to be put in circuit with said motor, a lever operated by the cam and opening or closing said switch, a starting resistance of one or more sections, one or more divided switch devices coupled at one part to corresponding starting resistance sections and sustained at the other part by a lever actuated by the cam, and electric circuit connections between the starting resistance, its switches and lever and the motor, through the first named switch.

10. The combination, with an electric railway vehicle, of a cam, an electric motor, a switch adapted to be put in circuit with said motor, a lever operated by the cam and opening or closing said switch, a motor current reverser actuated simultaneously with the cam, a starting resistance of one or more sections, one or more divided switch devices coupled at one part to corresponding starting resistance sections and sustained at the other part by a lever actuated by the cam, and electric circuit connections between the starting resistance, its switches and lever, the first named switch, the current reverser, the motor, and supply and return conductors.

11. The combination, with an electric railway vehicle, of a bar $a$, having operating means at opposite ends of the car, a motor, a current reverser $n$, connections $p$, $p'$, $p^2$ between the parts $a$, $n$, a cam $e$ on the bar $a$, a lever $f$ actuated by the cam, and a switch having one part on said lever, and in circuit at opposite parts with the supply conductor and current reverser and motor.

12. The combination, with an electric railway vehicle, of a bar $a$ having operating means at opposite ends of the car, and also having end slots $a'$ adapted to receive the coupling device $c'$, $c$, a motor, a current reverser $n$, connections $p$, $p'$, $p^2$ between the parts $a$, $n$, a cam $e$ on the bar $a$, a lever $f$ actuated by the cam, and a switch having one part on said lever and in circuit at opposite parts with the supply conductor and current reverser and motor.

13. The combination, with an electric railway vehicle, of a bar $a$ having operating means at opposite ends of the car, a motor, a current reverser $n$, connections $p$, $p'$, $p^2$ between the parts $a$, $n$, a cam $e$, on the bar $a$, a lever $f$ actuated by the cam, a switch $g$ having one solenoid magnet part on said lever and in circuit at opposite parts with the supply conductor and current reverser and motor.

14. The combination, with an electric railway vehicle, of a bar $a$ having operating means at opposite ends of the car, a motor, a current reverser $n$, connections $p$, $p'$, $p^2$ between the parts $a$, $n$, a cam $e$ on the bar $a$, a lever $f$ actuated by the cam, a switch having one part on said lever and in circuit with the current reverser and motor, a starting resistance of one or more sections, switch devices corresponding with said resistance sections, a lever $l$ operative by the cam $e$ and carrying divided parts of said resistance switches, and electric connections between the starting resistance, its switches and lever and the first named switch.

15. The combination, with the longitudinal connections, as bars $a$ slotted at $a'$, of two electric railway cars, and current controlling devices operative from said connections, of a coupling device comprising a bar $c$ and pendent end pins $c'$, $c'$ provided with retainers $c^2$, substantially as described.

In testimony whereof I have affixed my signature in the presence of two witnesses.

ERNST GUSTAV WILHELM CARL HOFFMANN.

Witnesses:
OSCAR NIELEFELD,
JOHN B. JACKSON.